United States Patent [19]
Ressler et al.

[11] Patent Number: 5,408,681
[45] Date of Patent: Apr. 18, 1995

[54] AUTOMATIC REPEATER STATION FOR SIGNAL TRANSMISSIONS

[75] Inventors: Elliott L. Ressler, Elkins Park; Yoram Levy, Philadelphia; Douglas A. Bancroft, Langhorne, all of Pa.

[73] Assignee: The United States of America as represented by the Secretary of the Navy, Washington, D.C.

[21] Appl. No.: 106,746

[22] Filed: Aug. 16, 1993

[51] Int. Cl.⁶ .............................................. H04B 7/14
[52] U.S. Cl. ...................................... 455/17; 455/20; 455/22; 455/126
[58] Field of Search ................... 455/17, 20, 22, 23, 455/24, 126, 127; 330/149; 332/162, 160

[56] References Cited

U.S. PATENT DOCUMENTS 3,922,674  11/1975  Gingras et al. ..................... 455/22
4,554,514  11/1985  Whartenby et al. ................ 332/160
4,941,200   7/1990  Leslie et al. ........................ 455/20
5,144,258   9/1992  Nakanishi et al. ................. 455/126

FOREIGN PATENT DOCUMENTS 0054742  3/1983  Japan .................................. 455/20

Primary Examiner—Curtis Kuntz
Assistant Examiner—Thanh C. Le
Attorney, Agent, or Firm—James V. Tura; James B. Bechtel; Susan E. Verona

[57] ABSTRACT

An automatic repeater station, sometimes called a relay system, is disclosed. The relay system receives signals, preferably at one band of frequencies, then filters and restores their inherent information, and finally transmits the restored information, preferably at another band of frequencies. Unlike the prior art systems utilizing transceivers and electronically tunable filters, the present invention uses separate receivers and transmitters and is devoid of electronically tunable filters.

10 Claims, 3 Drawing Sheets

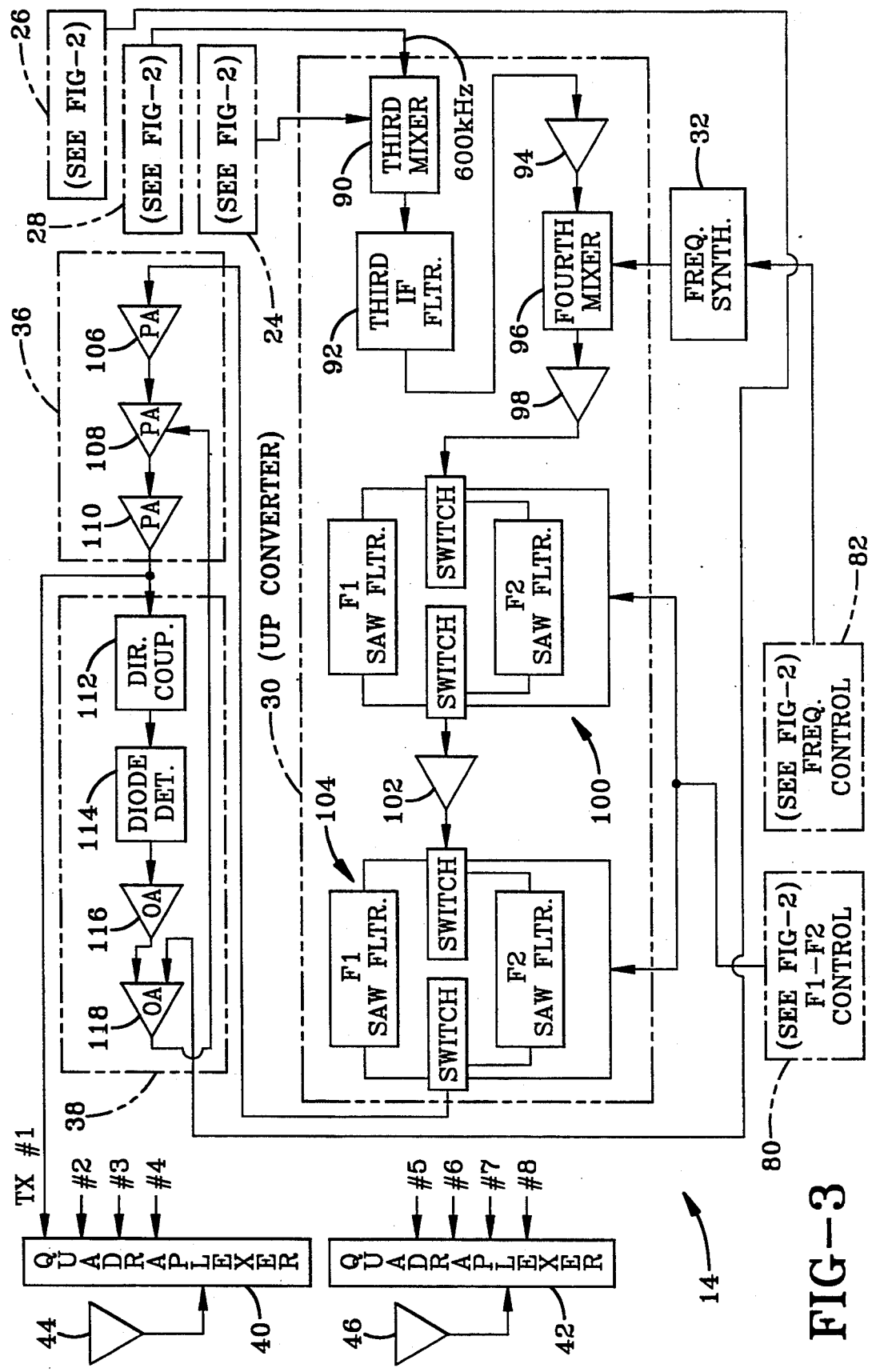

5,408,681

AUTOMATIC REPEATER STATION FOR SIGNAL TRANSMISSIONS

The invention described herein, may be manufactured and used by and for the Government of the United States of America for governmental purposes without the payment of any royalty thereon or therefor.

BACKGROUND OF THE INVENTION

The present invention relates to an automatic repeater station and, more particularly, to an automatic repeater station for serving at least eight (8) channels each having separate receivers and transmitters and all of which are devoid of any tunable filters.

Automatic repeater stations are commonly referred to as radio relay systems, or simply a radio relay, and may operate within the UHF frequency band of between 225–440 MHz commonly used in the military. The propagation of radio signals in the military UHF band (225–400 MHZ) is normally limited to the line of sight between two communicators. However, an airborne radio relay system, by means of its obtainable height, can increase the line of sight and hence increase the propagation range between communicators. The frequencies at which these signals are transmitted and received are grouped into channels, with particular channels being assigned to individual users.

At the present time, a maximum of only three channels can be relayed simultaneously in any one application. One of the primary reasons for this limitation is because a standard transceiver is used to perform both the receiving and transmitting functions of the relay system. The standard transceiver comprises a transmitter and a receiver both in one housing sharing a common input/output antenna connector and possibly other components. Because a transceiver cannot transmit and receive simultaneously, two transceivers must be used to service one relay channel and, therefore, six transceivers are needed to service three relay channels. Also, since a radio relay must receive and transmit simultaneously, two different frequencies are used and are commonly referred to as F1 and F2. The primary reason for the two different frequencies is to eliminate any self jamming therebetween. The use of one frequency F1 for receiving and a different frequency F2 for transmitting further increases the disadvantages of using a transceiver. In particular, one transceiver selected to operate at a particular frequency cannot be used for both transmitting and receiving.

Although it is desired that a relay system be provided having at least an eight channel capability, the use of transceivers for such a system would yield an oversized and overweight device both of which characteristics are detrimental to military applications and even to civilian applications. For example, a three channel relay that is now mounted in a pod, or streamline compartment of an aircraft, may have a total weight, including the pod, of about 720 pounds. It is desired that a relay system having an eight channel capability be provided, but without the use of transceivers so as to reduce the size and weight of the system.

In addition to relatively heavy transceivers, an additional relatively heavy device is an electronically tunable filter that is presently used in relay systems. It is desired that means be provided to eliminate the need of electronic tunable filters so as to further reduce the size and weight of the relay system.

SUMMARY OF THE INVENTION

The present invention is directed to an eight channel radio relay system operating in the UHF communication band of 225–400 MHz and having separate receiving and transmitting elements that do not include any electronically tunable filters.

The system of the present invention comprises a receiver splitter having an input stage connected to a receiving antenna and an output stage routing received signals to at least eight channels, a receiver section for each of the channels, a transmitter section for each of channels, and at least one quadraplexer having an input stage for accepting signals from at least four transmitter sections and an output stage for connection to a single transmitting antenna. The receiver section downwardly shifts the frequency of the received signal to develop one or more intermediate frequency signals that are more effectively filtered and amplified as compared to the higher frequency received signals. The transmitter section shifts one of the intermediate frequency signals upward to the frequency desired for transmission.

Accordingly, it is an object of the present invention to provide a relay system devoid of any transceivers and having at least an eight channel capability. The system has the need of only one receiving antenna and only two transmitting antennas. The system restores the signal received from a preceding station or user so that it may be more effectively transmitted to a subsequent user.

It is a further object of the present invention to provide a relay system that is devoid of any tunable filters so as to still further reduce the overall weight of the system.

Other objects, advantages and novel features will become apparent from the following detailed description when considered in conjunction with the accompanying drawings.

BRIEF DESCRIPTION OF THE DRAWINGS

FIG. 3 is a block diagram showing further details of the transmitting section shown in FIG. 1.

DETAILED DESCRIPTION OF THE PREFERRED EMBODIMENTS

Figure 1:
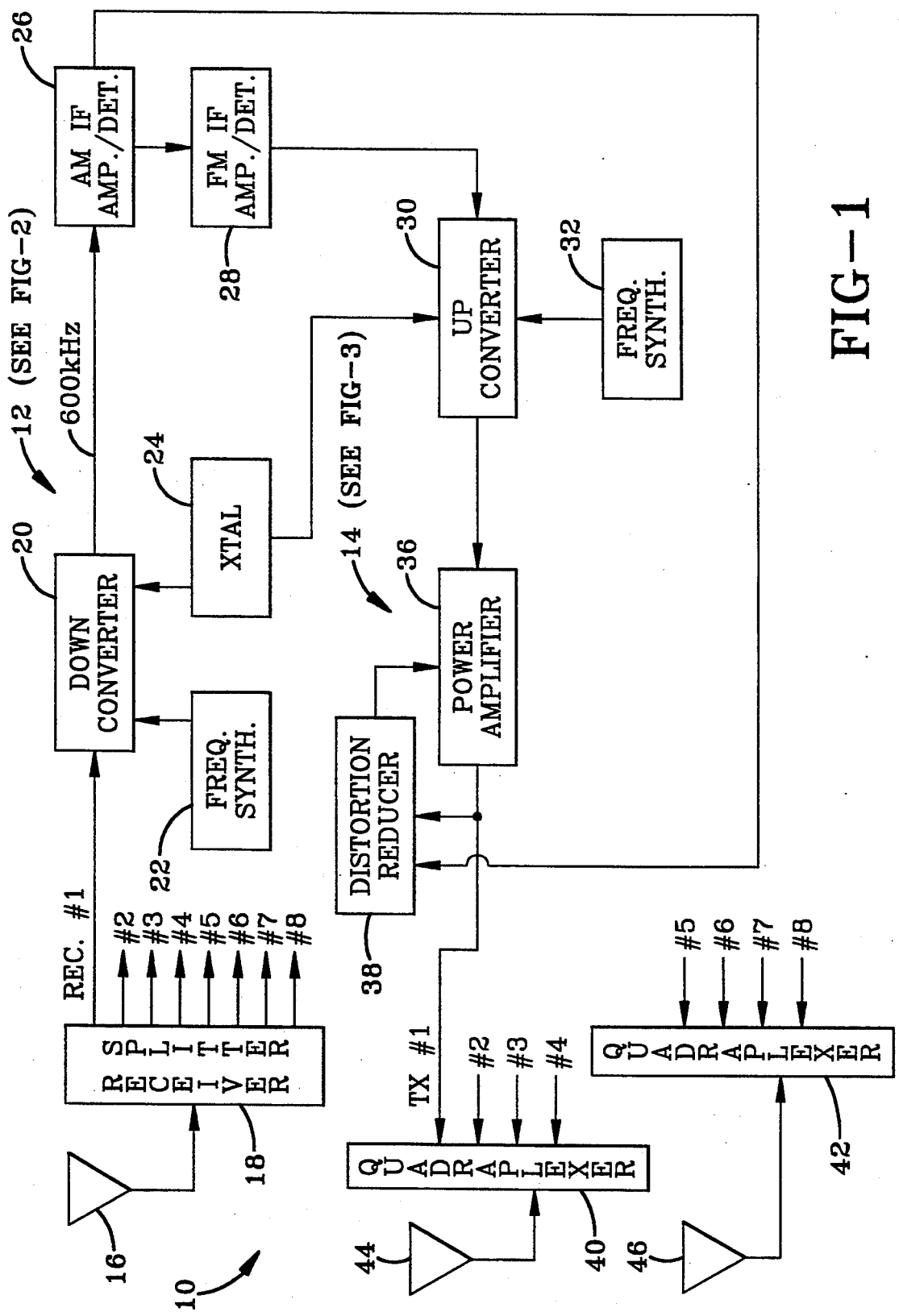
FIG. 1 is a block diagram showing the primary elements related to the present invention.

With reference to the drawings, wherein the same reference numbers are used to indicate the same elements, FIG. 1 illustrates a block diagram of the system 10 of the present invention. The system 10 is an automatic repeater station, commonly referred to as a relay station, having a plurality of channels, such as eight, each of which receives signals at a first range (F1) of frequencies and simultaneously transmits signals at a second range (F2) of frequencies. Each of the signals of the first (F1) and second (F2) ranges of frequencies include a carrier wave having riding thereon amplitude modulated (AM) and/or frequency modulated (FM) information. For the embodiment described herein, the signals F1 and F2 are preferably within a frequency band of between 225–400 MHz, with each channel having assigned a particular frequency within that band. However, it should be recognized that other frequency bands are contemplated by the practice of the present invention.

The system 10 has two modes of operation, with the first being an offset mode wherein a user transmits to the relay station on one frequency (F1) and receives from the relay station on a different frequency (F2). The other mode is a non-offset mode wherein a single frequency, such as F1, could be used by a user for transmission and reception. However, each of such users would be assigned one frequency for reception and another frequency for transmission. The hereinafter description of the system 10 of the present invention is primarily related to the offset mode, but it should be realized that the fundamentals of the operation of the present invention are equally applicable to the non-offset mode.

The system 10 comprises a receiver section 12 and a transmitter section 14 for each of the eight channels both arranged as shown in FIG. 1 and each of which comprises a plurality of elements respectively given in Tables 1 and 2.

TABLE 1

| REFERENCE # | ELEMENT |
| --- | --- |
| 16 | RECEIVING ANTENNA |
| 18 | RECEIVER SPLITTER |
| 20 | DOWN CONVERTER |
| 22 | FREQUENCY SYNTHESIZER (FREQ SNYTH) |
| 24 | CRYSTAL FREQUENCY OSCILLATOR (XTAL) |
| 26 | AM IF AMP/DET |
| 28 | FM IF AMP/DET |

TABLE 2

| REFERENCE # | ELEMENT |
| --- | --- |
| 30 | UP CONVERTER |
| 32 | FREQUENCY SYNTHESIZER (FREQ SYNTH) |
| 36 | POWER AMPLIFIER |
| 38 | DISTORTION REDUCER |
| 40 | FIRST QUADRAPLEXER |
| 42 | SECOND QUADRAPLEXER |
| 44 | FIRST TRANSMITTING ANTENNA |
| 46 | SECOND TRANSMITTING ANTENNA |

The elements of the eight channel relay system 10 are colocated, that is, the elements, in particular, the elements of the receiver section 12 and transmitter section 12 are positioned in close proximity to each other and share common facilities. A radio relay system having colocated elements, without the benefits of the present invention, may typically suffer a great deal of interference. This interference can be caused by transmitter broadband noise, transmitter back intermodulation and cross modulation distortion.

Transmitter broadband noise can reduce relay receiver sensitivity by adding noise directly to the colocated receivers. The present invention eliminates such noise by the selection of low noise power amplifier devices, such as field effect transistors. Further, this noise is eliminated, or at least reduced, by transmitter filtering and by providing sufficient isolation between the receiving and transmitting antennas.

Transmitter back intermodulation is produced when several transmitters share a common antenna and there is insufficient isolation between the transmitters. In such cases, a third order distortion product is produced when a second harmonic of one of the transmitters beats against the transmitted signal of another transmitter. Also, two different transmitters may beat against a third to produce this third order distortion product. The present invention eliminates, or at least reduces, such transmitter back intermodulation by providing the proper isolation between all of the transmitting sections 14 of the eight channels.

Cross modulation distortion may be caused by stronger interfering amplitude modulated signals mixing with weaker yet desired signals. The modulation of the stronger interfering signals "crosses over" onto the weaker signals and is particularly noticed in the colocated receiver's front end preamplifier or mixer. This type of interference is eliminated by the present invention by providing isolation between the transmitting and receiving elements and also by the use of circuit elements in the receiver section having a highly dynamic range.

The radio relay 10 preferably includes at least eight receiver sections 12 and eight transmitter sections 14, wherein, as shown in FIG. 1, each of the eight channels has one receiver section 12 and one transmitter section 14. As will be described, each of the receiver and transmitter sections 12 and 14, respectively, comprises various filter elements having predetermined passbands and stopbands. The selection of the parameters and design considerations of these filter elements are well known to those skilled in the art.

Each of the eight channels has a frequency synthesizer in both the receiver 12 and transmitter 14 sections in order to provide independent, simultaneous transmitting and receiving operation for the desired frequency signals. The receiver splitter 18 is a passive device and has its input stage coupled to the receiving antenna and its output stage connected to all eight channels (REC #1 . . . REC #8) and, thereby, routing the received signals to each of the eight channels. All of the eight receiver sections 12 have a down converter 20 which is connected to the output stage of the receiver splitter 18. The down converter 20 is also responsive to a first frequency synthesizer 22 and to a crystal oscillator 24. The down converter 20 shifts the frequency of the received signal downward to one of the intermediate frequency signals having a preferred frequency of 600 kHz. The amplitude modulated information present on the intermediate frequency is stripped or removed from the carrier by an AM IF amplitude (amp)/detector (det) 26. The stripped amplitude modulation is saved and subsequently reapplied within the transmitter section. The AM modulation is stripped away so that the remaining power amplifiers need not have a linear operation, such as class A operation. If a linear operation was needed, it would cause an increase in the power consumption, size and weight of the remaining amplifier elements. As previously mentioned, the reduction of weight (eliminate transceivers and tunable filters) is of particular importance to the present invention.

The amplitude detector 26 develops a first output, containing the amplitude modulated information, which is passed on to the transmitter section 14. The amplitude detector 26 also develops a second output, that is preferably routed to an FM IF amp/det 28, the limiter within the FM IF amp/det suppresses any amplitude information. This non-detected wave is then routed to the up converter 30.

The up converter 30 is responsive to a second frequency synthesizer 32 and to the crystal frequency oscillator 24. The up converter 30 shifts the intermediate frequency upward to the desired frequency F2 for transmission thereof. The up converter 30 generates an output signal that is applied to a power amplifier 36. The power amplifier 36 cooperates with a distortion reducer 38 having applied thereto an output signal from the AM IF amp/det 26.

The distortion reducer 38 employs negative feedback and includes means for rectifying the output of the power amplifier 36. The distortion reducer 38 receives the output of the AM IF amp/det 26, and combines it with its developed signal in order to reduce the distortion which may be present on the output signal of the power amplifier 36. The output signal of the power amplifier is routed to a first quadraplexer 40. The first quadraplexer 40 has an input stage that accepts the output signals from four different power amplifiers 36 each of a different transmitter section 14. The first quadraplexer 40 also has an output section that is connected to a single transmitting antenna, such as 44. The circuit arrangement 10 of FIG. 1, preferably serving eight channels, has a second quadraplexer 42 which operates in the same manner as quadraplexer 40 and has its output stage connected to a second transmitting antenna 46.

Each of the quadraplexers 40 and 42 includes a filter having passbands and stopbands for each of their four respective channels that it services so that one channel does not interfere with the transmission of the signals of the other three channels. The quadraplexers 40 and 42 each provide 50 db of isolation between each of the transmitting sections 14 which, in turn, operate in cooperation with each of their respective receiver sections 12 which may be further described with reference to FIG. 2.

Figure 2:
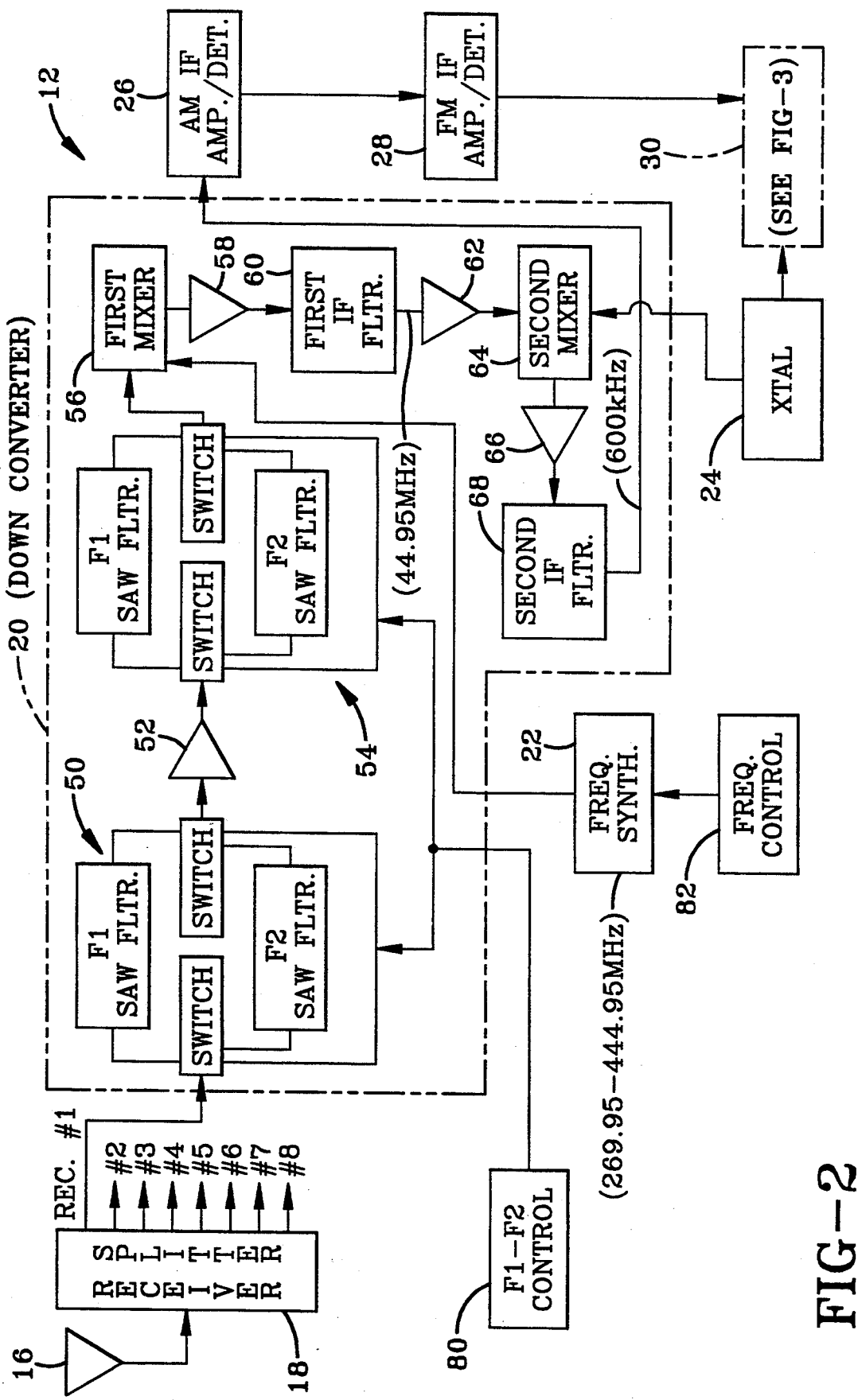
FIG. 2 is a block diagram illustrating further details of the receiver section shown in FIG. 1.

FIG. 2 shows further details of the receiver section 12 of FIG. 1 and, in particular, primarily shows the details of the down converter 20. The down converter 20 comprises various elements shown in Table 3.

TABLE 3

| REFERENCE # | ELEMENT |
|---|---|
| 50 | SURFACE ACOUSTIC WAVE (SAW) FILTER 1 |
| 52 | FIRST FET AMPLIFIER |
| 54 | SURFACE ACOUSTIC WAVE (SAW) FILTER 2 |
| 56 | FIRST MIXER |
| 58 | SECOND FET AMPLIFIER |
| 60 | FIRST IF FILTER |
| 62 | THIRD FET AMPLIFIER |
| 64 | SECOND MIXER |
| 66 | FOURTH FET AMPLIFIER |
| 68 | SECOND IF FILTER |

The down converter 20 preferably comprises both saw filters 50 and 54 but if desired, and while suffer degradation of performance characteristics, the single saw filter 50 may be used in the practice of the present invention. Each of the saw filters 50 and 54 is identical to each other and when used in the receiver section 12 respond to an external signal F1 from the F1-F2 control circuit 80 so that both the saw filters 50 and 54 provide filtering of the received signal F1. It should be realized that each of the preferred eight channels has an assigned F1, and also F2 to be described hereinafter. The selection of which frequency band that is filtered by saw filters 50 and 54 is accomplished by control circuit 80.

The saw filters 50 and 54 are of a low-loss type having a combined passband of 500 kHz which enables each of the receiver sections 12 to have the capability of tuning twenty (20), twenty-five (25) kHz channels. The saw filters 50 and 54, as well as the saw filters in the transmitter section 14 to be described, may sometimes be referred to herein as narrow band filters. The narrow bandwidth of these saw filters 50 and 54 at the UHF band (225–400 MHz) is one of the determining factors that allows for simultaneous transmitting and receiving of frequencies that are as close as 3 MHz to each other without causing any degradation of the performance of the receiver sections 12.

The saw filter 50 is connected to the output stage of the receiver splitter 18 and has a first bandpass section to pass the first range (F1) of the received signal. The saw filter 50 further comprises switch means at its input stage and switch means at its output stage. The switch means is preferably a PIN diode switch that is selected to have low intermodulation distortion and also selected to have a measured third order intercept point of better than +70 dbm. The PIN diode switches are both responsive to the control signal F1 of the device 80. This response allows the PIN diode switches to pass the first range (F1) of the received signal. The output of the saw filter 50 is routed to saw filter 54 by means of preamplifier 52.

The preamplifier 52 is preferably a power-field-effect transistor (FET) with a 2 db noise figure and having a +40 dbm third order intercept point. The selection of this FET together with the close in selectivity of the first saw filter 50 allows for a performance of −98 dbm sensitivity, while keeping the eight colocated transmitter sections 14 from introducing third order distortion and crossmodulation distortion.

The first mixer 56 preferably has a +30 dbm third order intercept point and has a first input connected to the output of a frequency synthesizer 22 and its second input connected to output of the saw filter 54. The first mixer 56 develops a first intermediate frequency signal which is equal to the difference of the frequency signals applied between its first and second inputs. The first mixer 56 receives its local oscillator injection from the frequency synthesizer 22 that is set to a value between 269.95–444.95 MHz so that it is to be 44.95 MHz above the frequency of the incoming signal from the saw filter 54. The frequency of the incoming signal is the same as the F1 frequency in the range between 225–400 MHz. The first mixer 56 produces a first intermediate frequency (IF) of 44.95 MHz which was selected because of the low spurious responses that it creates. The first intermediate frequency (IF) of 44.95 MHz is applied to a second FET amplifier 58.

FET amplifier 58 is a dual-gate type and has a 16 db gain, as well as being arranged to have automatic gain control (AGC). The FET amplifier 58 develops an output signal which is routed to a first IF filter 60.

The first IF filter 60 is an eight pole IF crystal bandpass filter and develops an output signal which is applied to a bipolar integrated circuit amplifier 62 having a 15 db gain factor. The amplifier 62 produces an output signal that is routed to the second mixer 64.

The second mixer 64 has its local oscillator injection supplied by the crystal frequency oscillator 24 generating a frequency signal of 44.35 MHz. The second mixer 64 develops a second intermediate frequency signal of 600 kHz which is equal to the difference of the frequencies of the signals applied to its first (44.95 MHz) and second (44.35 MHz) inputs. The output of the second mixer is applied to a second bipolar integrated circuit amplifier 66 which, in turn, develops an output signal that is applied to a second IF filter 68 of a ceramic type having a 70 kHz bandwidth. The output of the ceramic filter 68 is routed to the AM IF amp/det circuit 26.

Either amplitude modulated (AM) or frequency modulated (FM) type signals are applied to the AM IF amp/det 26 from the ceramic filter 68. The AM signal appears at two outputs. The means 26 develops a first output signal containing the stripped amplitude modulated information that is routed to an operational amplifier 118 and then to the second power amplifier stage 108 where modulation of an RF carrier takes place (shown in FIG. 3). The second output of means 26 also contains the received amplitude modulated signal which is then passed on to the FM IF amp/det 28 where limiters remove the amplitude modulation. The unmodulated carrier wave is then passed on to the up converter 30 and then to power amplifier 36 where the modulation which had previously been stripped from the carrier is now reapplied. The second output signal may contain frequency modulated (FM) information which is passed on to circuit 28.

The circuit 28 is a high gain amplifier preferably being of an integrated circuit. The 600 kHz signal fed into the circuit that may contain FM information is limited, amplified and passed on to the up converter 30 which may be further described in reference to FIG. 3.

FIG. 3 illustrates further details of the transmitter section of FIG. 1 as having five major sections which are as follows: the up converter 30, the power amplifier 36, the distortion reducer 38, two quadraplexers 40 and 42 and two transmitting antennas 44 and 46. The up converter 30 comprises a plurality of elements given in Table 4.

TABLE 4

| REFERENCE # | ELEMENT |
| --- | --- |
| 90 | THIRD MIXER |
| 92 | THIRD IF FILTER |
| 94 | THIRD BIPOLAR INTEGRATED CIRCUIT AMPLIFIER |
| 96 | FOURTH MIXER |
| 98 | FOURTH BIPOLAR INTEGRATED CIRCUIT AMPLIFIER |
| 100 | SURFACE ACOUSTIC WAVE (SAW) FILTER |
| 102 | FIFTH BIPOLAR INTEGRATED CIRCUIT AMPLIFIER |
| 104 | SURFACE ACOUSTIC WAVE (SAW) FILTER |

In general, the up converter 30 accepts the IF frequency signal of 600 kHz signal at a level of −7 dbm, filters, amplifies and shifts the frequency upward to the UHF 225–400 MHz band for transmission as signal F2. It is desired that the output signal of the up converter 30 be as high as possible so that the gain of the power amplifier 36 may be as low as possible so as to reduce the level of transmitted broadband noise. The power handling capabilities of the saw filter 104 places a limit on this level. More particularly, because the saw filter 104 has four (4) db loss, the output level that may be passed on to the power amplifier 36 is preferably +16 dbm. This output level (+16 dbm) is preferably selected so that no more than 100 millowatts (+20 dbm) may be injected into the saw filter 104.

The up converter 30 receives the 600 kHz intermediate frequency signal and is responsive to the second frequency synthesizer 32 and the crystal frequency oscillator 24, both previously discussed with reference to FIG. 3. The up converter 30 shifts the intermediate frequency 600 kHz signal upward to the frequency of F2 (225–400 MHz band).

The third mixer 90 has its first input connected to the crystal frequency oscillator 24 and its second input connected to the 600 kHz frequency signal. The third mixer develops a third intermediate frequency signal equal to the difference between its first and second inputs. In particular, the low IF frequency of 600 kHz beats against the 44.350 MHz crystal oscillator 24 to create a third intermediate frequency (IF) signal of 44.95 MHz. This third IF signal is then routed to a IF filter 92 which is a crystal filter and which develops an output signal that is applied to the third bipolar integrated circuit amplifier 94 having a 16 db gain factor. The amplifier 94 couples the third IF signal of 44.95 MHz to the fourth mixer 96.

The fourth mixer 96 has its first input (accepting the local oscillator injection) connected to the second frequency synthesizer 32 having a frequency range of 269.95–444.95 MHz and its second input connected to the third IF frequency of 44.95 MHz. The fourth mixer 96 develops a high frequency signal equal to the difference ((269.95–444.95 )−(44.95)=(225–400 MHz)) between its first and second inputs. This developed frequency signal is the signal F2 and is within the desired UHF range of 225–600 MHz. The frequency synthesizer 32 is responsive to a signal generated by the frequency control 82 so that the desired frequency of F2 (225–400 MHz) is selected for the particular channel assigned to the associated transmitter section 14. The output of the fourth mixer 96 is applied to the fourth bipolar integrated circuit amplifier 98 which, in turn, applies its amplified signal to the saw filter 100.

The saw filter 100, as well as the saw filter 104, have an operation which is the same as that previously described for saw filters 50 and 54 of the receiving section 12, except that the passbands and stopbands are selected for the frequency F2 of the channel associated with the respective transmitter section 14. Further, the PIN diode switches in the saw filters 100 and 104 are responsive to the F2 control signal generated by the control means 80. The cooperative action between saw filters 100 and 104 pass the different desired frequency signals and reject the undesired sum frequency signals that may be present on the signals and which may be the residue of previous frequency conversion processes. In addition, the filters 100 and 104 also prevent the broadband noise that accompanies the desired signals from entering the power amplifier 36 and otherwise causing interference with respect to the colocated receiver elements. The fifth bipolar integrated circuit amplifier 102, interposed between saw filters 100 and 104, provides 11 db of gain. The saw filter 104 develops an output signal that is applied to the power amplifier 36.

The power amplifier 36 preferably uses power field effect transistors (FET) for all three stages; 106, 108 and 110. The first stage 106 is biased for Class A operation and the second and third stages, 108 and 110, are biased for Class AB push-pull operation. The use of the FET transistors provides an output which is low in noise as compared to other transistor devices. Also, the FET devices 106, 108 and 110 have a negative temperature coefficient increasing their temperature handling capabilities which, in turn, improves the reliability of the devices. The overall gain of the power amplifier 36 is 30 db which provides a power level of 40 watts which is the desired peak power for the AM signals and the FM signals that are separately riding on the carrier frequency F2. The power amplifier 36 cooperates with the distortion reduced 38.

Distortion reducer 38, serving as a modulator, comprises a directional coupler (dir coup) 112, a diode detector (det) 114, a first operational amplifier 116, and a second operational amplifier 118. The operational amplifier 118 has applied to its first input the first output (amplitude modulated information) of the amplitude modulated stripping circuit 26. The distortion reducer 38 is arranged to provide for negative feedback in order to improve its ability to reduce distortion.

In operation, the directional coupler 112 accepts the output RF signal from the third stage 110 of the power amplifier 36 where AM modulation takes place and couples the RF signal to a diode detector 114. The diode detector provides an envelope signal which is first amplified and then level shifted by the operational amplifier 116. The output of the operational amplifier 116 is arranged so as to be 180 degrees out-of-phase with the incoming audio signal from the AM IF amp/det 26 applied to the second input of operational amplifier 118. The output of the operational amplifier 118 is routed to the gate of the second stage amplifier 108 of power amplifier 36. The distortion reducer 38 decreases the amount of distortion that may be present on the output of power amplifier 36 by a factor of between about 10% to about 3%. The output of the power amplifier 36 is routed to the first quadraplexer 40.

The first quadraplexer 40 and the second quadraplexer 42 respectively cooperate with transmitting antennas 44 and 46. The two quadraplexers 40 and 42 allow for eight transmitter sections 14 to share two antennas. The decrease from eight (known prior art devices) to two antennas represents a real saving in space aboard an aircraft. The two quadraplexers 40 and 42 each contain filters for each of the F2 radio frequency signals respectively assigned to the eight (8) channels and provide 50 db of isolation between the transmitter sections 14, while having a relatively low insertion loss of 2 db. The F1 (receive)-F2 (transmit) frequency pairs may differ from one another by a range from about of 3 Mhz to 19 MHz. Each of the quadraplexers 40 and 42 has a filtering circuit that operates so that the stopband of each of the channels of selected transmission frequencies do not interfere with the other channel passbands since all (four channels for one quadraplexer) share a common output; i.e., transmitting antenna 44 or 46.

It should now be appreciated that the practice of the present invention provides for a relay system having eight channel capabilities and wherein the relay system has separate receiver and transmitter sections. The receiver and transmitter sections each have a frequency synthesizer to allow for their autonomy, i.e., each may operate separately from each other. Furthermore, the present invention does not employ transceivers nor does it employ any tuned filtering devices. Accordingly, as discussed in the "Background" section, the present invention is not limited to the relatively heavy weight contributions from either the transceivers or the tunable filters. The present invention eliminates the unwanted transceivers and tunable filters by providing separate receiver and transmitter sections each having associated circuit components with predetermined parameters that are preselected to provide high performance characteristics for the relay system 10.

The present invention also provides a distortion reducer that decreases the distortion that may be present on the transmitted signal of the relay system by a factor from about 3% to about 10%.

Although the previously given description referred to the use of two saw filters in each of the receiving channels and in each of the transmitting channels, if desired, only one saw filter may be used in each of the receiving and transmitting channels with the understanding that reduced system performance more than likely will occur. Further, the relay system 10 has described the use of seven FET amplifiers (52, 58, 62, 66, 94, 98 and 102), but it will be appreciated by those skilled in the art that this number may be reduced, although the desired performance may also be correspondingly reduced.

Many modifications or variations of the present invention are possible in view of the above disclosure. It is therefore to be understood, that within the scope of the appending claims, the inventions may be practiced otherwise as specifically described.

What I claim is:

1. An automatic repeater station having a plurality of channels assigned thereto and that receives signals at a first range (F1) of frequencies and simultaneously transmits signals at a second range (F2) of frequencies, said signals of said first (F1) and second (F2) ranges of frequencies including a carrier having riding thereon amplitude modulated (AM) and/or frequency modulated (FM) information, said automatic repeater station having at least one receiving antenna and at least one transmitting antenna, said automatic repeater station comprising:

(a) a receiver splitter having its input stage coupled to said receiving antenna and its output stage connected to and supplying each of said plurality of channels with signals received by said receiving antenna;

(b) a first frequency synthesizer providing signals in a range of frequencies that includes and is higher than said first (F1) range of frequencies by a predetermined amount, said first frequency synthesizer having an output stage;

(c) a second frequency synthesizer providing signals in a range of frequencies that includes and is higher than said second (F2) range of frequencies by a predetermined amount, said second frequency synthesizer having an output stage;

(d) a frequency oscillator generating a signal at a frequency which is higher than an intermediate frequency by a predetermined amount, said frequency oscillator having an output stage;

(e) at least one down converter connecting one channel of said repeater to the output stage of said receiver splitter, said at least one down converter being connected to the output stages of and responsive to said first frequency synthesizer and said frequency oscillator, said at least one down converter shifting said received signals of said receiving antenna downward to the frequency of said intermediate frequency, said at least one down converter filtering and amplifying said received signals as the received signals are being shifted downward in frequency;

(f) means for receiving said downwardly frequency shifted signals and detecting and removing the amplitude modulated information from said downwardly frequency shifted signals, said means for detecting and removing also developing a first output containing the removed amplitude modulated information and also a second output, said second output serving as said intermediate frequency signal and which is devoid of amplitude modulated information;

(g) at least one up converter connected to receive said intermediate frequency signal, said at least one up converter being connected to the output stage of and responsive to said second frequency synthesizer and said frequency oscillator, said at least one up converter shifting the frequency of said intermediate frequency signal upward to said second (F2) range of frequency signals and amplifying and filtering said intermediate frequency signal while it is being shifted upward in frequency;

(h) a first operational amplifier for receiving said first output of said means for detecting and removing amplitude modulation;

(i) at least one power amplifier having a first input for receiving the output of said up converter and a second input, said power amplifier developing an output signal;

(j) at least one distortion reducer employing negative feedback and receiving the output signal of said power amplifier, said distortion reducer having means for rectifying said output signal of said power amplifier to an envelope signal, said envelope signal being applied to a second operational amplifier which, in turn, develops an output signal that is applied to a second input of said first operational amplifier, said first and second inputs of said first operational amplifier being arranged to be 180 degrees out-of-phase with respect to each other, said first operational amplifier having its output connected to said second input of said power amplifier;

(k) at least one quadraplexer having an input stage connected to the output signal of said power amplifier and an output stage connected to said transmitting antenna, said quadraplexer having a plurality of filters each with predetermined stopbands and passbands both being selected to respectively correspond to the frequency F2 and providing isolation between each of the plurality of channels using said transmitting antenna.

2. An automatic repeater station according to claim 1 further comprising an amplifier interposed between said first output of said means for detecting and removing the amplitude modulation and said at least one up converter.

3. An automatic repeater station having a plurality of channels assigned thereto and that receives signals at a first range (F1) of frequencies and simultaneously transmits signals at a second range (F2) of frequencies, said signals of first (F1) and second (F2) ranges including a carrier having riding thereon amplitude modulated (AM) and/or frequency modulated (FM) information, said automatic repeater station having at least one receiving antenna and at least one transmitting antenna, said automatic repeater station comprising:

(a) a receiver splitter having its input stage coupled to said receiving antenna and its output stage connected to and supplying each of said plurality of channels with signals received by said receiving antenna;

(b) a first frequency synthesizer providing signals in the range of frequencies that includes and is higher than said first (F1) range of frequencies by a predetermined amount, said first frequency synthesizer having an output stage;

(c) a plurality of down converters having a number corresponding to said plurality of assigned channels, each of said down converters comprising:

(i) at least one narrow band filter connected to the output stage of said receiver splitter, said at least one narrow band filter having a first bandpass section to pass said first range (F1) of frequencies, said narrow band filter further comprising switch means at its input stage and switch means at its output stage, each of said switch means being responsive to an applied control signal for routing the received signal from said receiver splitter to said first bandpass filter section, said at least one narrow band filter developing an output signal that is filtered by said first bandpass filter section;

(ii) a first mixer having a first input connected to the output stage of said first frequency synthesizer and a second input connected to the output of said at least one narrow band filter, said first mixer developing a first intermediate frequency signal equal to the difference between its input signals;

(iii) a frequency oscillator generating an output signal at a frequency which is higher than said first intermediate frequency by a predetermined amount;

(iv) a second mixer having a first input connected to said first intermediate frequency and a second input connected to the output signal of said frequency oscillator, said second mixer developing a second intermediate frequency signal equal to the difference between its inputs;

(d) means for detecting and removing the amplitude modulated information from said second intermediate frequency signal, said means for detecting and removing also developing a first output signal containing the removed amplitude modulated information and also a second output signal devoid of said amplitude modulated information;

(e) a first operational amplifier for receiving said first output signal of said means for detecting and removing and developing an output signal;

(f) a third mixer having a first input connected to said second output of said means for detecting and removing amplitude modulated information and a second input connected to the output signal of said frequency oscillator, said third mixer developing a third intermediate frequency signal equal to the difference between its inputs;

(g) a second frequency synthesizer providing signals in a range of frequencies that includes and is higher than said second (F2) range of frequencies by a predetermined amount, said second frequency synthesizer having an output stage;

(i) a fourth mixer having a first input connected to receive the third intermediate frequency signal of said third mixer and a second input connected to the output of said second frequency synthesizer, said fourth mixer developing a fourth intermediate frequency signal equal to the difference between its inputs;

(j) at least one second narrow band filter connected to receive the fourth intermediate frequency signals of said fourth mixer, said at least one second narrow band filter having a second bandpass filter section to pass said second range (F2) of frequency signals, said at least one second narrow band filter further comprising switch means at its input stage and switch means at its output stage, each of said switch means being responsive to applied control signals for routing the signals from the third mixer to said second bandpass section, said at least one second narrow band filter developing an output signal that is filtered by said second bandpass filter section;

(k) a power amplifier having a first input for receiving the output of said second at least one second narrow band filter and a second input, said power amplifier developing an output signal;

(l) a distortion reducer employing negative feedback and receiving said output signal of said power amplifier and having means for rectifying said power amplifier output signal to an envelope signal, said envelope signal being applied to a second operational amplifier which, in turn, develops an output signal that is applied to a second input of said first operational amplifier, said first and second inputs of said first operational amplifier being arranged to be 180 degrees out-of-phase with respect to each other, said first operational amplifier having its output connected to said second input of said power amplifier; and (m) at least one quadraplexer having an input stage connected to the output signal of said power amplifier and an output stage connected to said transmitting antenna, said quadraplexer having a plurality of filters each having predetermined stopbands and passbands that are selected to correspond to one of the frequencies in said frequency band F2 and providing isolation between each of the plurality of channels sharing said transmitting antenna.

4. An automatic repeater station according to claim 3 further comprising a serially arranged amplifier and a third narrow band filter cooperating with said first narrow band filter to provide amplification and further filtering of the signal that is applied to said first mixer.

5. An automatic repeater station according to claim 3 further comprising a first serial arrangement of an amplifier, a second filter having a predetermined passband, and a third amplifier, said serial arrangement being interposed between said first and second mixers.

6. An automatic repeater station according to claim 3 further comprising a second serial arrangement of an amplifier and a filter having a predetermined passband, said second arrangement being interposed between said second mixer and said means for detecting and removing amplitude modulated information.

7. An automatic repeater station according to claim 3 further comprising an amplifier and conditioning module interposed between said second output of said means for detecting and removing amplitude modulated information and said third mixer.

8. An automatic repeater station according to claim 3 further comprising a third serial arrangement of an amplifier and filter having a predetermined passband, said third serial arrangement being interposed between said third and fourth mixers.

9. An automatic repeater station according to claim 3 further comprising a third serial arrangement of an amplifier, a third narrow band filter and another amplifier, said third arrangement interposed between said fourth mixer and said second narrow band filter.

10. An automatic repeater station according to claim 3, wherein said power amplifier comprises a three stage arrangement of field effect transistors with the first stage being biased for class A operation and the second and third stages being biased for class AB push-pull operation.

* * * * *